Jan. 11, 1949.    H. KLEMPERER ET AL    2,458,516

RECTIFYING SYSTEM

Filed Dec. 5, 1945

INVENTORS
HANS KLEMPERER
WILLIAM F. HUNTLEY
By Elmer J. Gorn
ATTY.

Patented Jan. 11, 1949

2,458,516

UNITED STATES PATENT OFFICE 2,458,516

RECTIFYING SYSTEM

Hans Klemperer, Belmont, and William F. Huntley, Lowell, Mass., assignors to Raytheon Manufacturing Company, Newton, Mass., a corporation of Delaware Application December 5, 1945, Serial No. 632,950

5 Claims. (Cl. 175—363)

This invention relates to rectifying systems, and more particularly to an arrangement for delivering smooth rectified current from a single phase alternating current source.

An object of the invention is to provide such a system in which the direct current output has less ripple or deviation from the ideal square output wave than that resulting from the conventional prior art systems, and which therefore requires less filtering in order to produce the desired steady or unfluctuating direct current for utilization in a load device.

Another object of the invention is to provide a rectifying system of the above character in which no condensers or other external energy-storage means are used.

A further object is to provide such a system which is relatively simple to construct and easy to maintain.

Figure 1:
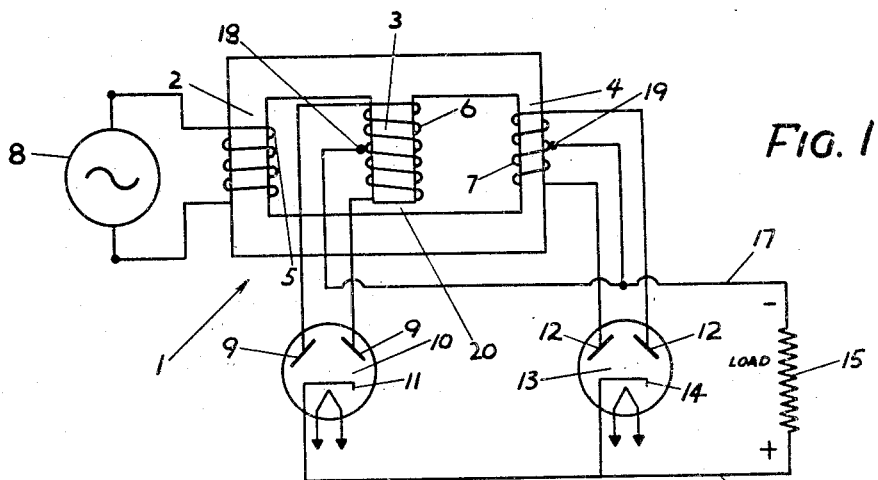

The foregoing and other objects of the invention will be best understood from the following description of an exemplification thereof, reference being had to the accompanying drawing, wherein:

Fig. 1 is a diagrammatic representation of a circuit embodying the novel system; and Figs. 2, 3, 4, and 5 represent various voltages and fluxes flowing in the novel system.

In Fig. 1 there is represented a transformer core 1 of the three-phase type, having three legs 2, 3, and 4. Around these legs are placed, respectively, primary winding 5, secondary winding 6, and tertiary winding 7, windings 6 and 7 being center-tapped at 18 and 19, respectively. Winding 5 is connected to a source of alternating current 8 and serves as the exciting winding. The two end terminals of secondary winding 6 are connected to the respective anodes 9 of a full-wave thermionic rectifier tube 10. Tube 10 contains a cathode 11, which is raised to emission temperature by any suitable heater. The two end terminals of tertiary winding 7 are connected to the respective anodes 12 of a second full-wave thermionic rectifier tube 13. Tube 13 also contains an indirectly-heated cathode 14. Cathodes 11 and 14 of tubes 10 and 13 are connected together to serve as the positive lead 16 for the direct current output of the system, while midtap 18 of winding 6 and midtap 19 of winding 7 are connected together in a similar manner to serve as the negative lead 17 for the direct current output. Load device 15 is connected across leads 16 and 17. The load is here represented as a resistor but may be any type of load for which a D. C. supply is desired. The voltages appearing across windings 6 and 7 are rectified and combined or mixed by the circuit including the two rectifiers 10 and 13, and are then applied to the load.

Leg 3 of transformer 1 is spaced from the main body of the transformer core, at a point adjacent its end, to provide an airgap 20. Leg 4 of transformer 1 is made of smaller cross-sectional area than the remainder of the core, so that this leg will become saturated or will reach the saturation point, in regard to magnetic flux, a substantial time before the primary flux reaches its maximum value.

Legs 3 and 4 therefore provide, in effect, two flux paths in parallel across the magnetomotive force represented by the current from source 8 flowing through primary winding 5. One of these two paths, that including leg 3 is of high reluctance, due to the presence of airgap 20 which is effectively in series with this flux path. The other of these two paths, that including leg 4, is initially of lower reluctance, due to the continuous path through the ferromagnetic material of this leg, but, as this leg approaches saturation, it acts in effect as a very high reluctance flux path because even though the primary or exciting flux continues to increase, the flux through saturated leg 4 remains substantially at a constant value, which is that at the point of saturation.

Figure 2:
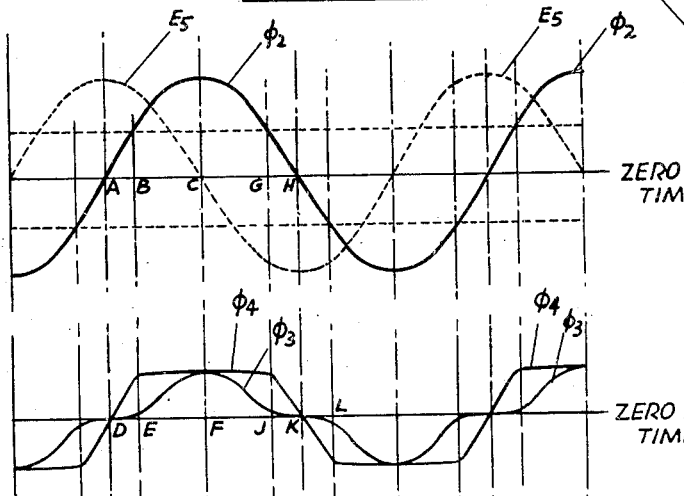
Figure 3:
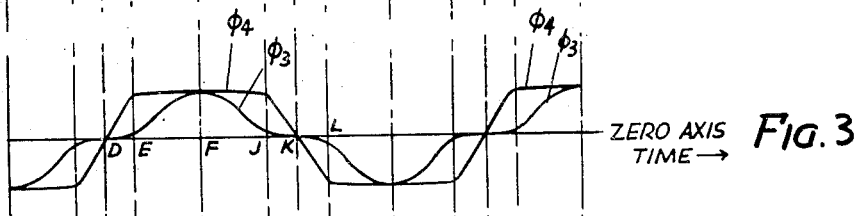

The above relations of fluxes are explained more fully in connection with Figs. 2-3. In Fig. 2, curve $E_5$ represents the sinusoidal voltage applied to winding 5 from source 8. Curve $\phi_2$, in the same figure, represents the primary alternating magnetic flux which results from the magnetomotive force of current from the source flowing through primary winding 5. Under ordinary conditions, as is well known, this flux is also sinusoidal in wave form and is ninety degrees out of phase with the voltage across the winding, and it is so represented in Fig. 2. In Fig. 2, the dashed horizontal lines above and below the zero axis represent the values of flux at which leg 4 becomes saturated.

In Fig. 3, curve $\phi_3$ represents the cyclical variation of magnetic flux in leg 3 of the transformer, while curve $\phi_4$ represents the cyclical variation of magnetic flux in leg 4 of the transformer. Since the flux paths including legs 3 and 4 are effectively in parallel across the source of primary magnetic flux, as stated above, the sum of the instantaneous flux values of curves $\phi_3$ and $\phi_4$ will at all times be equal to the primary flux $\phi_2$, neglecting the slight leakage fluxes which naturally occur. Starting at the zero point A of primary flux curve $\phi_2$, as the primary flux begins to increase, the flux in the two parallel paths of legs 3 and 4 will also begin to increase; however, due to the fact that leg 3 originally has a much higher reluctance than leg 4, the original rate of change of flux in leg 4 will be greater than that in leg 3, as shown between points D and E in Fig. 3. As point B is reached on the primary flux curve $\phi_2$, which point represents the value of flux necessary to saturate leg 4, curve $\phi_4$ begins to flatten out rather abruptly, due to its effectively increased reluctance, as shown at point E in Fig. 3. Since the total primary flux $\phi_2$ must equal the sum of secondary flux $\phi_3$ and tertiary flux $\phi_4$, and since flux $\phi_4$ is now tending to remain at a fixed value, due to saturation of leg 4, the flux in leg 3 now begins to increase more rapidly, as shown adjacent point E in Fig. 3. Between points B and C, as the primary flux $\phi_2$ continues to increase sinusoidally, secondary flux $\phi_3$ also increases substantially sinusoidally, as shown between points E and F in Fig. 3, while, due to saturation of leg 4, tertiary flux $\phi_4$ remains substantially at a fixed value, increasing only very slightly if at all. As primary flux $\phi_2$ decreases sinusoidally from C to G, secondary flux $\phi_3$ also decreases substantially sinusoidally from F to J, while tertiary flux $\phi_4$ decreases only very slightly, if at all, because leg 4 is still saturated. When point G is reached in the sinusoidal cyclical decrease of primary flux $\phi_2$, the saturation value of flux for leg 4 is again reached but in the downward direction, so that tertiary flux $\phi_4$ now begins to decrease rather rapidly, as shown at point J in Fig. 3. Also, due to the now decreased reluctance of leg 4 as compared with leg 3, the rate of change of secondary flux $\phi_3$ begins to decrease, so that curve $\phi_3$ tends to flatten out somewhat at this point, as seen in Fig. 3. Between points G and H on primary flux curve $\phi_2$, secondary flux $\phi_3$ and tertiary flux $\phi_4$ both decrease toward zero, as shown between joints J and K in Fig. 3, curve $\phi_4$ now changing at a much more rapid rate than curve $\phi_3$, as explained above.

The variations of secondary flux $\phi_3$ and of tertiary flux $\phi_4$ during the next, or negative, half-cycle of primary flux $\phi_2$ are exactly similar to those just described for a positive half-cycle of primary flux, but are in the opposite direction from the zero axis, as shown in Fig. 3, so that the curves $\phi_3$ and $\phi_4$ are of a periodic symmetrical character, the periods being the same as the half-cycles of primary flux $\phi_2$.

Figure 4:
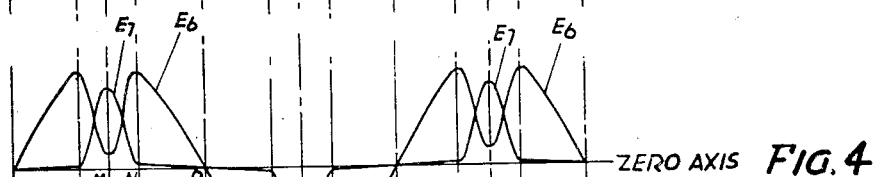

Fig. 4 represents the voltages induced in windings 6 and 7, due to transformer action, as a result of the flux changes in legs 3 and 4 which have been described. In this figure, curve $E_6$ represents the voltage induced in secondary winding 6, while curve $E_7$ represents the voltage induced in tertiary winding 7. Between points D and E, before leg 4 becomes saturated, the flux in leg 3 is changing relatively slowly, as stated above, so that the voltage $E_6$ induced in winding 6 is correspondingly low, but is greater than zero, as shown at point M in Fig. 4. As leg 4 becomes saturated, the rate of change of flux in leg 3 increases, so that the induced voltage $E_6$ rises toward a maximum at point N or at point E of the flux curve. As flux $\phi_3$ approaches a maximum at point F, its rate of change decreases so that induced voltage $E_6$ decreases toward zero and passes through a value of zero at point P, or when flux curve $\phi_3$ has a slope of zero at point F. As flux $\phi_3$ decreases from point F, induced voltage $E_6$ increases from zero but in a negative direction, reaching a maximum negative value substantially at point J of flux curve $\phi_3$. Beyond point J, the rate of change of secondary flux $\phi_3$ has decreased rather abruptly, so that induced voltage $E_6$ also decreases. As curve $\phi_3$ approaches a zero value in the vicinity of point K, induced voltage $E_6$ continues to decrease until, substantially at point K, a minimum rate of change of flux $\phi_3$ is reached and a minimum induced voltage $E_6$ is also reached. This minimum value of induced voltage is not zero, however, because in this region the rate of change of flux $\phi_3$ never drops to zero. As the rate of change of flux $\phi_3$ increases beyond point K, induced voltage $E_6$ again increases toward a maximum negative value, which it reaches substantially at point L of the flux curve, as described above for a maximum positive value at point N, again reaching a value of zero when flux curve $\phi_3$ reaches its maximum negative value. The above-described variation of voltage induced in winding 6 is repeated periodically. It will therefore be seen that, between maximum positive and maximum negative points of flux curve $\phi_3$, or of primary flux $\phi_2$, a voltage wave having two humps or lobes with a valley or depression between is induced in winding 6; this wave may be considered to be a mixture of the fundamental frequency of source 0 and of odd harmonics of said fundamental.

The voltage induced in tertiary winding 7 will have a high value at point D of curve $\phi_4$, since at this point, as stated above, the rate of change of flux in leg 4 is relatively high. Between points D and E of flux curve $\phi_4$, as the saturation point of leg 4 is being approached, the rate of change of flux in leg 4 is decreasing, so that induced voltage $E_7$ also decreases. When leg 4 becomes saturated, at or near point E in Fig. 3, the flux in said leg no longer increases, but remains substantially constant, increasing only extremely slightly if at all; therefore induced voltage $E_7$ drops to substantially zero. Voltage $E_7$ remains substantially at zero until tertiary flux $\phi_4$ begins to decrease as a result of primary flux $\phi_2$ reaching the saturation value (of leg 4) on its downward trend. When tertiary flux $\phi_4$ begins to decrease, which it does at a relatively rapid rate, induced voltage $E_7$ begins to increase, in a negative direction; it increases until point K on the flux curve is reached, at which time it again begins to decrease as leg 4 approaches saturation in a negative direction. The above-described variation of voltage induced in winding 7 is repeated periodically. It will therefore be apparent that, between maximum positive and negative points of primary flux $\phi_2$, a voltage having the form of a single peaked impulse or wave is induced in winding 7, the peak occurring in the vicinity of the zero value of $\phi_2$.

It will therefore be seen that the peak of curve $E_7$ occurs during the "valley" of the double humped wave $E_6$. If, therefore, the waves $E_6$ and $E_7$ are combined or mixed, the peak of $E_7$ will "fill in" the valleys of curve $E_6$, giving a combined wave which has a relatively flattened top and is closer to a square wave than the sinusoidal impulses produced by other rectifying systems. The output of this system therefore has less ripple than that produced in other systems. The waves $E_6$ and $E_7$ are combined, or mixed, and rectified in the circuit including rectifiers 10 and 13, as stated above.

Figure 5:
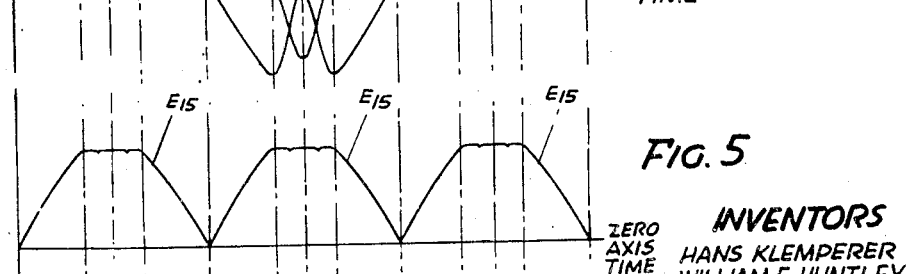

Fig. 5 depicts, by means of curve $E_{15}$, the voltage appearing across load 15. This is a three-humped, substantially square wave, or a series of substantially square-wave impulses, entirely on the positive side of the zero axis, which results from combining or superposing and rectifying, in a full-wave manner, the voltages $E_6$ and $E_7$ induced in windings 6 and 7, respectively. By means of the full-wave rectification, the negative portions of both waves, $E_6$ and $E_7$, are reversed in polarity and appear on the positive side of the zero axis in Fig. 5.

The invention is not limited to the particular details described above as many equivalents will suggest themselves to those skilled in the art. For example, the rectifying tubes which are used may be of any convenient type, or the rectifiers may be of the dry type. The transformer used may be of any convenient type, modified in accordance with the teachings of the invention. It is accordingly desired that the appended claims be given a broad interpretation commensurate with the scope of the invention within the art.

What is claimed is:

1. A rectifying system comprising a three-legged transformer core with a primary winding around one leg, a secondary winding around a second leg, and a tertiary winding around the third leg, a source of alternating current connected to said primary winding, said second leg being adapted to produce in said secondary winding by transformer action from said source a double-lobed voltage wave with a depression between said lobes, said third leg being adapted to produce in said tertiary winding by transformer action from said source a peaked induced voltage wave, the peak of said last-mentioned wave occurring in time phase with the depression of said first-mentioned wave, and means for mixing and rectifying said waves.

2. A rectifying system comprising a transformer core having three legs and a plurality of windings, one winding being wound around each leg, one leg having an airgap included therein and another leg being of reduced cross-sectional area relative to the remainder of the core, a source of alternating current connected to one of said windings, two rectifying devices, means for connecting the windings associated with said one leg and said other leg in circuit with said rectifying devices to combine and rectify the voltages induced in said last-named windings, and a load device connected to be supplied with the combined and rectified voltages.

3. A rectifying system comprising a transformer core having three legs, a winding around one of said legs, separate windings around each of the other two legs, a source of alternating current connected across said one winding, two full-wave rectifiers, the two remaining windings of said transformer being connected together through said rectifiers in such a manner as to combine and rectify the voltages induced in said remaining windings from said one winding due to transformer action, one of said other legs having an airgap included therein, said airgap being in series with the flux path through the same leg, the other of said other legs being constructed and arranged to become saturated during increase of flux produced by said one winding, whereby a double-lobed voltage wave is induced in the winding associated with said one of said other legs, and whereby a peaked voltage wave is induced in the winding associated with the second of said other legs, the peak of said second wave occurring between the lobes of said first wave, the combination of said two voltage waves when rectified producing a substantially flattened-top output wave.

4. A rectifying system comprising a transformer core having three legs, a separate winding around each leg to constitute primary, secondary, and tertiary windings, a source of alternating current connected to the ends of said primary winding, center taps on both the secondary and tertiary windings, the leg carrying the primary windings being continuous, one of the remaining legs of the core being discontinuous to provide an airgap and the other of the remaining legs being of reduced cross-sectional area relative to the core body, two full-wave thermionic rectifiers each having a pair of anodes and a cathode, a load device, means connecting said center taps together and to one terminal of the load device, means connecting said two cathodes together and to the other terminal of the load device, means connecting each end of said secondary winding to a corresponding anode of one of said rectifiers, and means connecting each end of said tertiary winding to a corresponding anode of the other rectifier.

5. A rectifying system comprising a transformer core having first, second, and third legs, a separate coil wound around each of said legs, means for energizing a first of the coils with alternating current, said second leg being constructed and arranged to produce a double-humped effect in the voltage induced in the coil wound therearound, said third leg being constructed and arranged to produce a peaked effect in the voltage induced in the coil wound therearound, means for combining and rectifying the induced voltages to produce a substantially flattened-top voltage output, and load means connected to be energized by said output.

HANS KLEMPERER.
WILLIAM F. HUNTLEY.

REFERENCES CITED

The following references are of record in the file of this patent:

UNITED STATES PATENTS

| Number | Name | Date |
| --- | --- | --- |
| 1,960,047 | Bedford | May 22, 1934 |